July 27, 1965  S. THURSTON  3,196,823
DRAG REDUCING MEANS

Filed March 19, 1963  2 Sheets-Sheet 1

INVENTOR.
SIDNEY THURSTON
BY Edwin Coates
ATTORNEY

July 27, 1965  S. THURSTON  3,196,823
DRAG REDUCING MEANS
Filed March 19, 1963  2 Sheets-Sheet 2

INVENTOR.
SIDNEY THURSTON
BY
Edwin Coates
ATTORNEY

3,196,823
DRAG REDUCING MEANS
Sidney Thurston, Santa Ana, Calif., assignor, by mesne assignments, to Douglas Aircraft Company, Inc., Santa Monica, Calif.
Filed Mar. 19, 1963, Ser. No. 266,393
18 Claims. (Cl. 114—67)

This invention relates to water borne vehicles and particularly to means and methods for increasing the efficiency of operation by reducing the friction drag.

It is well known that a major portion of the drag, or resistance to forward movement, of a water borne vehicle of either the submerged or surface type is the friction drag of the water in its relative flow past the vehicle. A substantial reduction in such drag provides a very noticeable increase in efficiency which can be used to advantage in different ways. The speed can be increased with the same power expenditure, or the power can be reduced for the same speed which, in turn, provides better economy and reduces the weight of the power plant.

Various schemes have been proposed and tried in an effort to reduce the friction drag and have met with varying degrees of success. One of the oldest and most obvious is polishing the wetted surface or applying coatings of smooth finish materials. Another scheme is the ejection of air through the hull of the craft near the nose or through perforated pipes extending from the craft to reduce the water density and presumably its viscosity in the boundary layer. A modification of this is the ejection of a mixture of water and air plus a soap or detergent of some kind to maintain the air bubbles. These latter schemes are helpful but they require a considerable amount of machinery aboard the craft and conduits to transport the mixture from the pumps to the surrounding water. In submerged vehicles these conduits obviously must pass through the walls, which is an additional drawback.

The mechanical arrangements outlined above are advantageous when it is necessary or desirable to maintain the drag reduction for long periods of time although the advantage is substantially reduced by the fact that the power used to operate them could otherwise be used to increase the driving power for the vehicle. In any event their complication and power requirements rule them out as solutions for the problem of maintaining maximum drag reduction for limited periods of time. One example of such requirement is the operation of a torpedo. The time lapse from firing until it reaches the target is only a few minutes but the target is usually moving and increased speed of the torpedo means more accuracy in firing. There is no available space within the torpedo to store any type of drag reducing material or to accommodate any additional equipment to pump it into the flowstream, and any external means must be small and produce substantially no drag increase itself. Such means which will operate for ten to twenty minutes will serve the purpose very well.

Military submarines also have a requirement for short term high drag reduction when they are attacked and pursued by enemy craft. Drag reduction is equivalent to power increase so far as speed is concerned and a difference in maximum speed of a few knots for as little as an hour may spell the difference between escape and destruction.

Another requirement of the same type is found in military landing craft or amphibious tanks. The closer they approach to the beachhead the more important it is to increase the maximum speed to avoid gunfire, and a device which will function even for only the last half of the approach is of tremendous value.

Another field of use for a short term drag reducer is in the operation of hydrofoil craft. In order to become airborne or to "ride up" on the hydrofoils the craft must overcome the "drag hump", or the force required for the hull to break away from the surface, which usually requires more power than does the sustained high speed cruise condition. This represents one of the most critical aspects of the hydrofoil propulsion problem as the propulsive device is operating at a poor efficiency at this time. A successful drag reducer can provide very significant improvements in the overall hydrofoil craft performance by allowing the use of lower powered prime movers. The reduced power requirement and consequent reduced weight allow a larger payload to be carried.

The method and means of the present invention can be successfully applied in various forms to any type of water borne vehicle, including those mentioned above and in some forms can provide drag reduction for several hours. The invention is based on the fact that many substances when dissolved or homogeneously mixed in water have the property of imparting to it non-Newtonian characteristics. Water, whether salt or fresh, and at temperatures normally encountered by water borne vehicles has values of fluidity and surface tension which are almost constant, varying in only a narrow range. These are known as Newtonian characteristics and the soluble or mixing materials which are of interest are those which increase the fluidity or reduce the surface tension or both, thus imparting non-Newtonian characteristics to the water.

In the practice of the invention any suitable material—generically a shear or drag reducing material—is dissolved or homogeneously mixed in the water passing relatively rearwardly past a water borne vehicle, which may be on or below the surface, at a point at or near the nose of the vehicle so that the water which forms the boundary layer of the vehicle will have a surface tension or shear-force less than normal. Since the boundary layer by definition is all of the water extending between the film clinging to the surface of the vehicle and the free stream, a reduction in its shear strength or shear factor will reduce the force or power necessary to shear the layers and therefore will reduce the friction drag.

The drag reducing material, which may be termed an additive, is solidified into a matrix of desired shape and mounted exteriorly of the vehicle at or near the fore end. When the vehicle travels forwardly through the water the relative flow over the solidified mass of the drag reducing agent causes it to gradually dissolve or mix in the water which then forms the boundary layer of the vehicle in passing. Whether the combination is technically a solution, suspension, emulsion, or colloid is not important to the result, and they are all generically included in the terms "solution" and "mixture." In one embodiment the agent takes the form of a cap which fits over the nose portion of the vehicle. In another, it takes the form of a ring which surrounds the fore end. In another embodiment, when it is desired to control the submersion of the agent it is formed on a core which in turn is carried on a movable support on a craft. This latter arrangement is particularly suitable for landing craft and hydrofoil craft.

A few of the materials which have been found suitable for use are Polyox WSR–35 (polyethylene oxide, molecular weight 1,000,000), Dowfax 9N–40 (ethylene oxide adduct on p-nonylphenol—with 40 ethylene oxide units), and Ja Guar or Jaguar ($\beta$–1,4 - glycosidic mannose branched $\alpha$–1,6-glycosidic linkage). The invention is not limited to the use of these materials but may be carried out with any material which, on dissolution or mixing with water, will reduce the shear factor or surface tension. The material should retain its shape either alone or when mixed with other soluble materials at the water temperatures encountered in practice and should dissolve or disintegrate slowly enough to accomplish the mission.

The materials mentioned, together with many others, have been found to satisfy these requirements. Some of them, in concentrations as low as one hundredth of one percent modify the characteristics of water sufficiently to produce a significant reduction in drag. While the action is not completely understood it has been observed that when water is treated with these materials it exhibits a notable slipperiness like soap water or wallpaper paste. In one aspect it might be considered that the lubricity of the water has been increased.

One important advantage of the present invention over systems like the one above mentioned which utilize water and detergent arises from the fact that most of the materials suitable for these purposes have a maximum concentration in water of about five percent. Therefore, for a given amount of useful material a craft must carry twenty times the weight or volume compared to the present invention and must have comparatively large storage and ejection facilities. Another important point is that many of these materials when made up in a wet mixture begin to lose their effectiveness in less than a week and therefore must often be replaced without having been used. In the present invention the drag reducing additive remains dry until used and hence can be stored practically indefinitely.

Various other advantages and features of novelty will become apparent as the description proceeds in conjunction with the accompanying drawings, in which.

Figure 1:
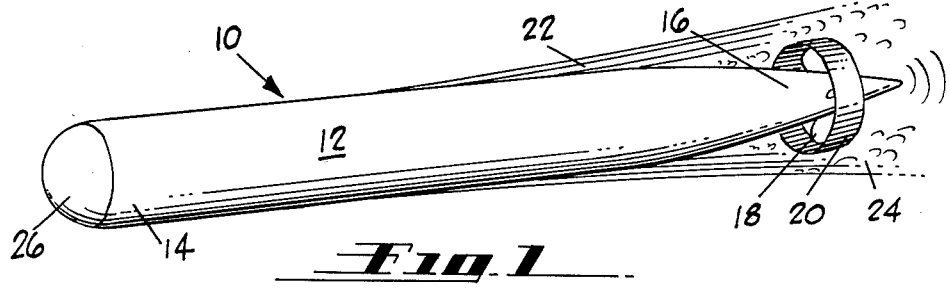
FIG. 1 is a perspective view of a torpedo bearing a drag reducing nose cap and showing the boundary layer.

The torpedo 10 shown in FIG. 1 has a central or main body portion 12 with relatively blunt fore end or nose 14 and a tapered aft end or tail 16 carrying a propeller 18 surrounded by shroud 20. The boundary layer 22 consists of the water located between the free stream and the surface of the torpedo and, as shown, this boundary layer gradually thickens toward the rear of the vehicle. The film of water at the skin surface of the vehicle adheres to it and moves backward slowly so that it is considered as stationary with respect to the vehicle. The free stream is the water which is unaffected by the passage of the vehicle and is considered as moving rearwardly at the speed of the vehicle. Obviously the layers in between must be sheared from each other as the vehicle progresses and the force required to shear them constitutes the friction drag. When the shear forces are very high or the curvature changes substantially the laminar flow becomes turbulent, as indicated at 24, and even more energy goes into friction drag.

Figure 2:
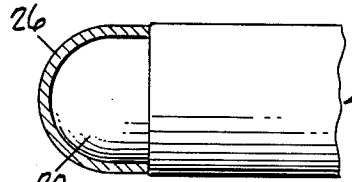
FIG. 2 is a fragmentary side elevational view of the torpedo of FIG. 1, partly in section.

To decrease this drag a nose cap 26 is provided on the fore end of the vehicle as seen in FIG. 2. Preferably the normal contour of the nose or fore end 28 is decreased and the cap is dimensioned so that the combination has the original contour but the cap can, if desired, be applied directly to the existing nose with its trailing edge being feathered to eliminate undesirable protuberances.

The cap 26 constitutes a mass or body of a water soluble material which, when mixed or dissolved in water, imparts to it non-Newtonian characteristics of reduced shear factor or surface tension or both. When the vehicle travels forwardly through the water the material gradually disintegrates and enters into the boundary layer. As the layer thickens the material is dispersed throughout substantially all of it. Because of the presence of the material in the boundary layer the inter-facial tensions are decreased and therefore the shear-force is reduced with a corresponding decrease in the friction drag. The drag reducing agent or additive in most cases is mounted entirely exteriorly of the body and requires no operative connection with the interior, and it can be applied with little or no change in the structure of the vehicle. The material used may be any material having the desired chacteristics, and two or more materials may be mixed together to give the desired solidity or rate of disintegration in water at the temperature encountered. A matrix can also be formed with relatively small proportions of soluble or miscible materials which do not contribute to the drag reduction but which help to solidify the mass to the desired degree.

Figure 3:
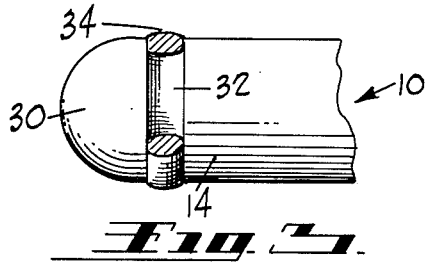
FIG. 3 is a view similar to FIG. 2 showing a variation in the form of the drag reducing agent.

In the modification shown in FIG. 3 the domed nose 30 of the vehicle retains its original or normal contour and an annular recess or depression 32 is formed in the wall of the fore end 14 at or near the base of the domed nose. A ring 34 of the drag reducing additive is formed in place in depression 32 and extends slightly beyond the contour as shown, although in some cases it may be made flush. Also if desired it may be formed in several sections, mounted in the groove and secured together in any suitable way. The sizes of the ring and the depression are exaggerated for clarity and the depth of the depression is actually so slight proportionately that it has no appreciable drag effect when the ring has been used up.

Figure 4:
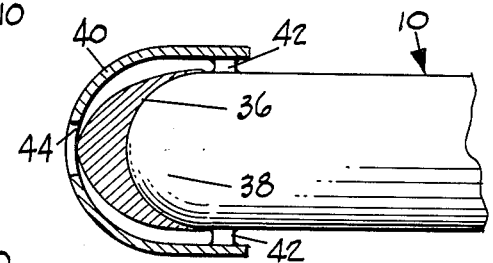
FIG. 4 is a view similar to FIG. 2 showing another embodiment of the invention.

The arrangement shown in FIG. 4 includes a dome shaped layer 36 of drag reducing additive overlying the nose 38 of the vehicle and a cap or shield 40 of insoluble material, preferably metal, overlying layer 36 but spaced therefrom. At its base end it is attached to the vehicle by spacing brackets 42 to provide a uniform spacing from layer 36 and to provide a rearwardly facing exit opening. The arrangement is completed by a central inlet opening 44 to provide a uniform path of flow for the water over all parts of layer 36. The water is modified by dissolving the material and issues rearwardly in an annular sheath surrounding the body of the vehicle, forming the basis of the boundary layer. The flow directing effect of the shield helps to establish and maintain laminar flow, and this function continues even after the drag reducing material has been exhausted.

A submarine presents the problem of maintaining the drag reducing agent intact until an emergency arises which calls for its use. If the installation is intended for a one-shot operation of short duration, such as about an hour, then a construction which would store the additive within the vehicle and then move it to the exterior for use would be so complicated as to outweigh the advantages to be derived. For a one-shot installation the material should be stored on the exterior in the position of use and should be protected against water until the emergency arises. At that time the protection should be removed without the use of any movable devices passing through the wall of the submarine.

Figure 5:
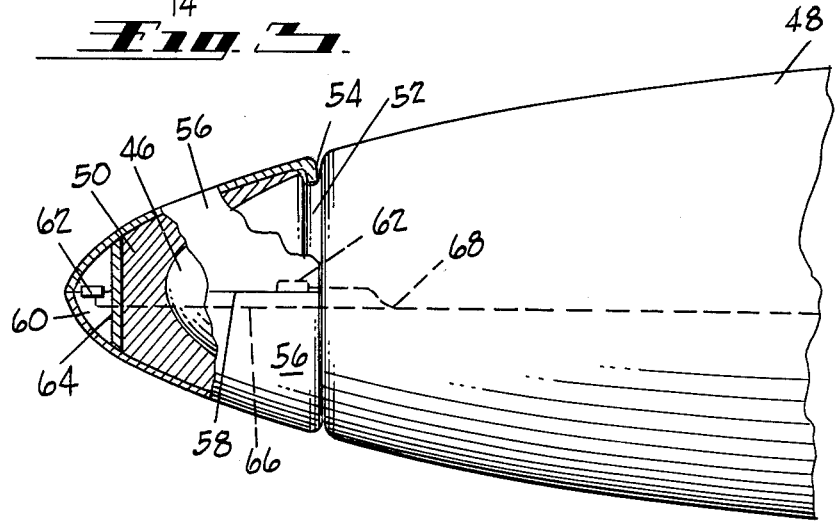
FIG. 5 is a view similar to FIG. 2 showing a modified form of the invention applied to the fore end of a submarine.

The arrangement shown in FIG. 5 fulfills the requirements mentioned above. In this figure the nose 46 of the submarine 48 carries a layer 50 of drag reducing material. An annular anchoring groove or recess 52 encircles the nose of the vehicle and receives the base flange 54 of the shield which is made up of two or more shell portions 56. These shell portions are secured together along their parting lines 58 by a suitable waterproof cement and similar material is placed in groove 52 to seal the flange. With this arrangement the drag reducing layer is totally enclosed and remains so until action is taken to remove the shield.

For this purpose a cavity 60 is provided at the peak of the shield and an explosive squib 62 is mounted therein. A plate 64 behind the squib protects layer 50 from the explosive effects. A similar squib 62 is located inside the shells at each parting line near flange 54. Electrical leads 66 and 68 extend from the squibs through sealed openings in the wall of the vehicle and continue back to an operator's station. When it is desired to use the drag reducing agent in an emergency the squibs are exploded simultaneously, blowing the shells apart along the parting lines and forcing flange 54 out of groove 52 to jettison the shell portions. Layer 50 is now exposed to the water and performs its intended function.

Figure 6:
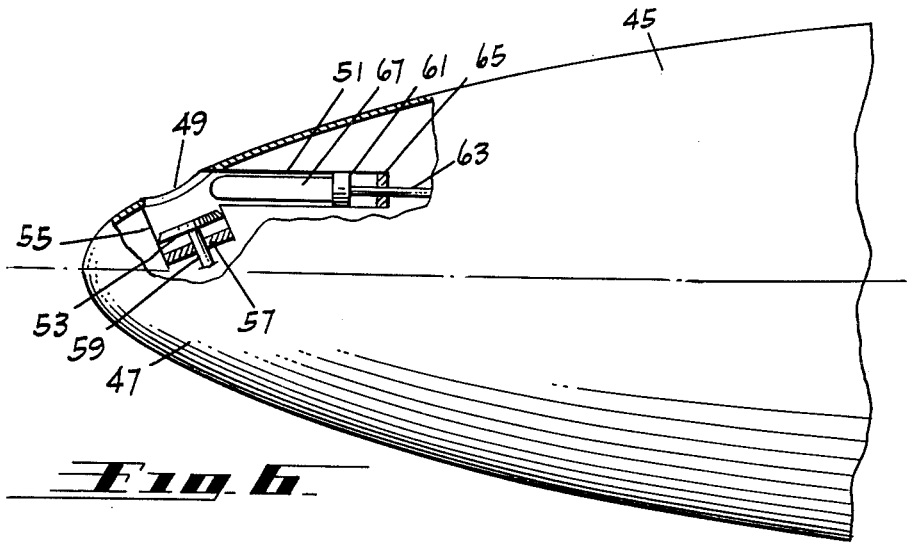
FIG. 6 is a plan view of the fore end of a submarine with parts broken away to show another variant of the invention.

The submarine 45 depicted schematically in FIG. 6 is provided at its fore end 47 with a pair of substantially identical installations adapted for repeated drag reducing operations of any desired duration. These installations are located at opposite sides of the center line of the craft and only one is shown for simplicity.

An opening 49 similar to a torpedo port is formed in the skin of the craft and a supply tube 51 communicates with it. A plug type hatch cover 53 normally seals opening 49 and is movable to inoperative position on occasion within tube 55 which forms a Y-connection with supply tube 51, the two tubes being sealed to each other and to the skin of the craft around opening 49. Tube 55 is provided with a rear closure plate 57 through which an operating rod 59 passes in sealing engagement. The hatch cover 53 is carried by the forward end of the rod to cover and uncover opening 49.

A slide block 61 is longitudinally movable in tube 51 in sealing engagement with its inner wall and is actuated by operating rod 63 which slidingly and sealingly passes through the rear wall or closure plate 65 of tube 51. The slide block carries attached to its forward side an elongated mass or body of drag reducing material 67 which can be moved to any desired fore and aft position. In operation the hatch cover is opened and body 67 is extended forwardly to a point where its free end is flush or just outside the contour of the craft. It will then dissolve or disintegrate gradually and combine with the water flowing rearwardly over the surface of the craft to reduce its surface tension and shear factor. As the material is used up the body can be moved forward in small increments. When the emergency is over, body 67 is retracted and the hatch cover 53 is closed. The remaining material is then ready for instant use at any time.

Since the two tubes are sealed off completely the entire installation is effectively exterior of the remaining portion of the craft, and leakage problems are practically nonexistent. At the same time the installation is extremely simple and effective. Obviously the hatch cover can be mounted and moved in other ways, and the installation can actually be mounted in a relatively small low-drag streamlined blister at each side of the nose of the craft. The arrangement shown is merely exemplary of a multiple use installation which can be made practically as simple as a one-shot installation.

Figure 7:
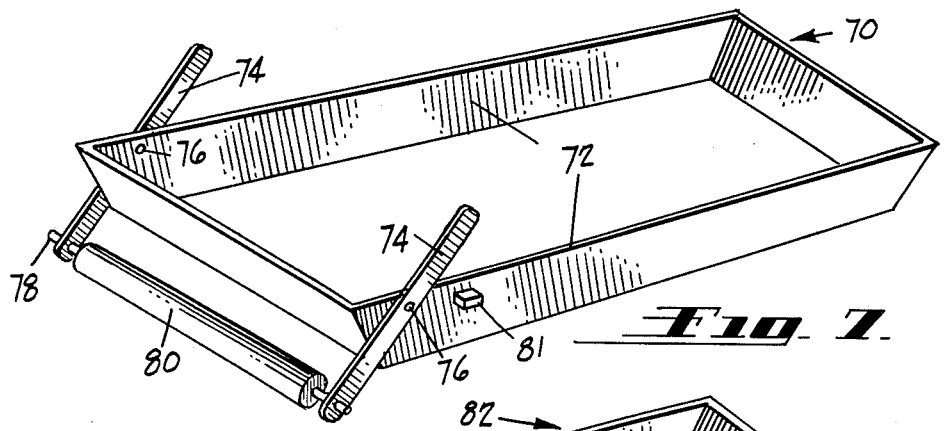
FIG. 7 is a perspective generalized view of a landing craft with a drag reducing device mounted thereon.

The landing craft 70 in FIG. 7 includes a pair of side walls 72 to which are rotatably secured a pair of arms 74 by means of pivots 76. An elongate rod 78 is secured to the lower ends of the arms and serves as a core for the drag reducing agent 80 which is shown as an elongate cylinder although it may take any other suitable form. It may be molded on the core or molded separately and then secured to the core. Preferably it has a lateral extent at least as great as a major portion of the beam of the craft so that it may directly modify most if not all of the flowstream which comes in contact with the hull. When the use of the agent is not necessary or desired the arms are rotated until their upper ends are locked under stops 81. In this position the free ends of the rods hold the agent above the water in inoperative condition. During a landing operation the agent is maintained clear of the water until the time comes for a maximum speed effort. It is then submerged and reduces the drag for the balance of the run.

Figure 8:
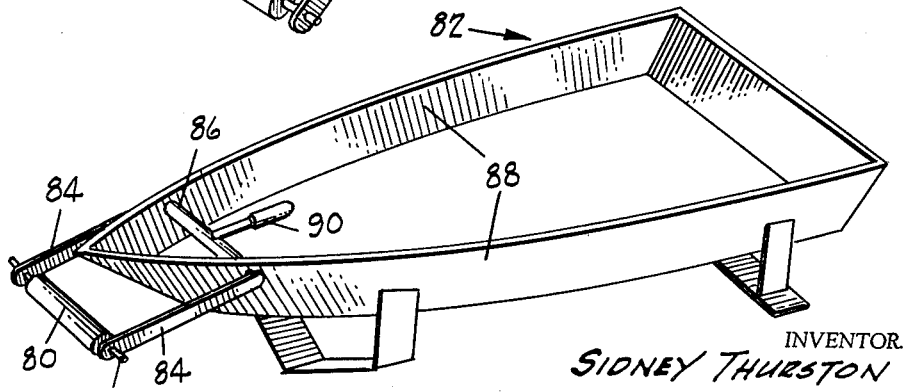
FIG. 8 is a similar view of a hydrofoil craft.

A similar arrangement is shown in FIG. 8 as applied to a hydrofoil craft 82. In this case core 78, carrying drag reducing agent 80, is secured to the free ends of arms 84, the other ends of which are secured to a torque shaft 86 pivotally mounted in the side walls 88 of the craft. Handle 90 is fixedly connected to the torque shaft and is used to raise and lower the drag reducing agent in the same fashion as in FIG. 7. In operation the agent is held in raised position until the craft gets under way with its hull still supported by the water. It is lowered as the craft approaches the lift-off-condition and is used to condition the water so that the drag reduction will permit the craft to overcome the "drag hump" with minimum power. As soon as the craft rides up on the hydrofoils the agent will leave the water and can be raised to inoperative position, since it will not be used again until the next take-off.

It will be apparent to those skilled in the art that various changes and modifications may be made in the construction and arrangement of parts as herein disclosed without departing from the spirit of the invention and it is intended that all such changes and modifications shall be embraced within the scope of the following claims.

I claim:

1. A water borne vehicle having a fore end and an aft end; and a water drag reducing agent located exteriorly of said vehicle and mounted adjacent the fore end thereof in a position to be subjected to contract by water flowing relatively rearward along the surface of said vehicle; said agent being adapted to dissolve in and change the basic characteristics of said water to reduce the shear-force in the boundary layer of the vehicle.

2. A water borne vehicle having a fore end and an aft end; and means for reducing the friction drag of said vehicle comprising a solidified mass of material which is soluble in water; said material having the property, when dissolved in water, of imparting thereto non-Newtonian characteristics; said mass being mounted adjacent the fore end of said vehicle at the exterior thereof for direct contact by and solution in the water supporting said vehicle.

3. A water borne vehicle having a fore end and an aft end; and a layer of solidified water soluble material secured to its fore end; said material having the property of reducing the shear factor of the water in which it is dissolved; said layer being subjected to the relative flow of water upon forward movement of the vehicle and gradually dissolving in the water adjacent the surface of said vehicle to reduce the shear factor of the boundary layer and delay the transition from laminar to turbulent flow.

4. A water borne vehicle having a generally dome shaped fore end and a tapering aft end; and a layer of solidified water soluble material having a generally dome shape corresponding to that of said fore end and secured thereover to form a cap; said material having the property of reducing the shear factor of the water in which it is dissolved; said layer being subjected to the relative flow of water upon forward movement of the vehicle and gradually dissolving in the water adjacent the surface of the vehicle to reduce the shear factor of the boundary layer.

5. A vehicle as claimed in claim 4; and, in addition thereto, a dome shaped insoluble cap mounted to said fore end and overlying said dome shaped layer in spaced relation thereto to provide an annular rearwardly facing exit opening; said insoluble cap having an inlet opening in its forward end to provide for rearward flow of water between said cap and said layer.

6. A waterborne vehicle having a fore end and an aft end and having a generally annular cross-section at its fore end; a generally annular depression formed in its surface at said fore end; and a ring of solidified water soluble material surrounding said fore end and seated in said depression; said material having the property of reducing the shear factor of the water in which it is dissolved; said ring being adapted to gradually disintegrate and dissolve in the water flowing adjacent the surface of said fore end to reduce the shear factor of the boundary layer.

7. Means for reducing the friction drag of a water borne vehicle comprising: a solidified mass of water soluble material which has the property of reducing the shear factor of the water in which it is dissolved; said mass being shaped and arranged for mounting exteriorly of the fore end of a vehicle in the path of the relative flow of water past the vehicle to contact and dissolve in said water and reduce the shear-force in the vehicle's boundary layer.

8. Friction reducing means as claimed in claim 7; said mass being in the form of a dome-shaped shell to serve as a cap over the correspondingly shaped nose of a vehicle.

9. Friction reducing means as claimed in claim 7; said mass being in the form of a ring to surround and be secured to the fore end of a vehicle.

10. Friction reducing means as claimed in claim 7; said mass being monted on a core; and said core having means for attachment to the fore end of a vehicle.

11. A water borne vehicle of the surface craft type having a fore end and an aft end; support means movably mounted to the fore end of said vehicle; and a water soluble shear factor reducing agent carried by said support means; said agent having the property of dissolving in water upon contact to reduce its shear factor; said support means being movable to one position to maintain said agent out of contact with the water and to another position to maintain said agent submerged in the water flowing rearwardly past the fore end of said vehicle.

12. A water borne vehicle as claimed in claim 11; said agent being mounted on a core; and said support means comprising at least one arm pivotally mounted on said vehicle and having a free end; said core being mounted on said free end.

13. A water borne vehicle as claimed in claim 11; said vehicle having a beam of predetermined lateral extent; and said agent having a lateral extent equal to at least a major proportion of the lateral extent of the beam in order to modify the character of substantially all of the water contacting the surface of said vehicle.

14. A water borne vehicle having a fore end and an aft end; and means for reducing the water friction drag of said vehicle comprising a port in said fore end; a supply container in communication with said port; a solidified mass of water soluble material in said container having the property of reducing the shear factor of the water in which it is dissolved; and adjustable means to move said mass through said port to subject it to the flow of water past said vehicle.

15. A vehicle as claimed in claim 14; and, in addition thereto, means to open and close said port to prevent access of water to said mass at will.

16. Means for reducing the friction drag of a water borne vehicle comprising: a solidified mass of water soluble material which has the property, upon solution in water, of imparting thereto non-Newtonian characteristics; and means for mounting said mass adjacent the fore end of said vehicle and exteriorly thereof and subjecting it to the flow of water past said vehicle to dissolve the material and modify the boundary layer by reducing the local shear-force and velocity gradient.

17. A water borne vehicle having a generally dome shaped fore end and a tapering aft end; and a layer of solidified water soluble material having a generally dome shape corresponding to that of said fore end and secured thereover to form a cap; said material having the property of reducing the shear factor of the water in which it is dissolved; said layer being subjected to the relative flow of water upon forward movement of the vehicle and gradually dissolving in the water adjacent the surface of the vehicle to reduce the shear factor of the boundary layer; a dome shaped cap of waterproof material mounted to said fore end and overlying said dome shaped layer; said cap being formed of a plurality of separable shell portions sealingly secured together and sealingly secured to said fore end to completely enclose said layer and isolate it from the surrounding water; and means located externally of the vehicle to forcibly separate said shell portions and jettison them to expose said layer to the action of the flowstream.

18. A water borne vehicle having a fore end and an aft end; means for reducing the friction drag of said vehicle comprising a mass of material which is soluble in water; said material having the property, when dissolved in water, of imparting thereto non-Newtonian characteristics; said mass being mounted adjacent the fore end of said vehicle in position for direct contact by and solution in the water supporting said vehicle; enclosure means of waterproof material overlying said soluble material and isolating it from the surrounding water; and means to open said enclosure means to expose soluble material to the action of the flowstream.

References Cited by the Examiner

UNITED STATES PATENTS

| | | |
|---|---|---|
| 2,492,173 | 12/49 | Mysels. |
| 2,969,759 | 1/61 | Giles _____ 114—67 X |
| 3,023,760 | 3/62 | Dever. |
| 3,099,993 | 8/63 | Smith. |

OTHER REFERENCES

"Missiles and Rockets" publication vol. 8, No. 16, April 17, 1961 (page 26 relied on).

FERGUS S. MIDDLETON, *Primary Examiner.*

BENJAMIN A. BORCHELT, *Examiner.*